May 3, 1932.  A. C. SPEARS  1,856,519
IDENTIFICATION NAME PLATE
Filed Sept. 25, 1931    2 Sheets-Sheet 1

Inventor
Arthur C. Spears
By Clarence A. O'Brien
Attorney

May 3, 1932.  A. C. SPEARS  1,856,519
IDENTIFICATION NAME PLATE
Filed Sept. 25, 1931    2 Sheets-Sheet 2

Inventor
Arthur C. Spears

By Clarence A. O'Brien
Attorney

Patented May 3, 1932

1,856,519

UNITED STATES PATENT OFFICE

ARTHUR CLYDE SPEARS, OF CAMERON, NEW YORK

IDENTIFICATION NAME PLATE

Application filed September 25, 1931. Serial No. 565,164.

The present invention relates to an identification name plate or the like particularly designed for use on automobile windshields and the like and has for its prime object to provide an illuminated plate which may be held on the inside of a windshield so that the indicia on the plate may be read from the exterior of the automobile.

Another very important object of the invention resides in the provision of an identification device of this nature which is simple in its construction, inexpensive to manufacture, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 1:
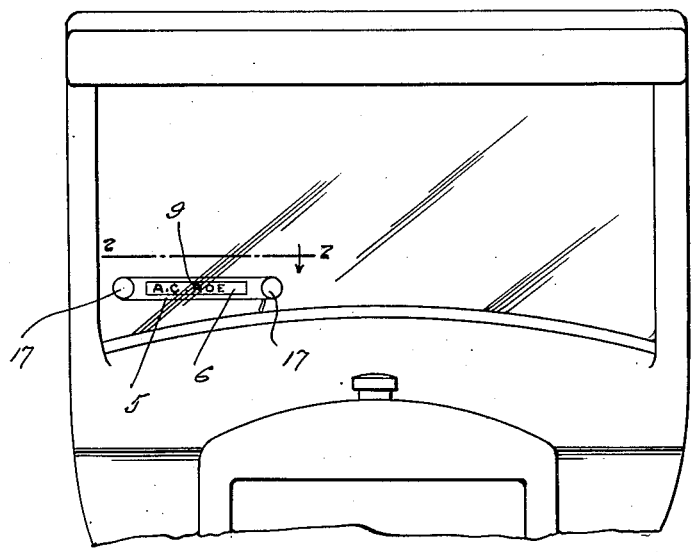
Figure 1 is a fragmentary front elevation of an automobile showing one of the devices in place.
Figure 2:
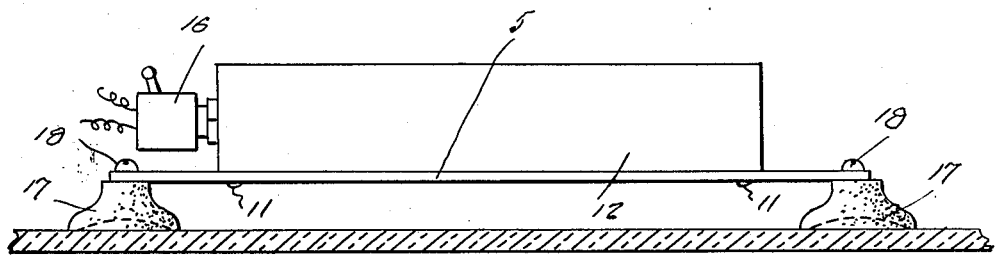
Figure 2 is a top plan view of one of the devices showing the windshield in section taken substantially on the line 2—2 of Figure 1.
Figure 3:
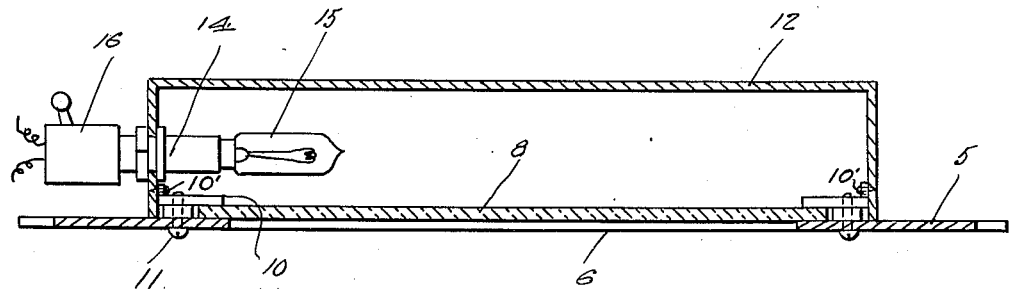
Figure 3 is a longitudinal section through one of the devices.
Figure 4:
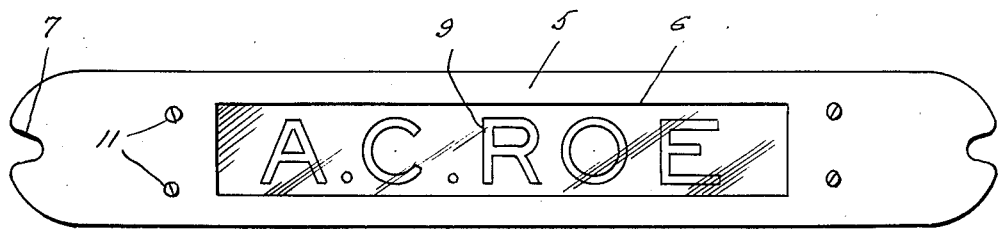
Figure 4 is a front elevation of one of the devices.
Figure 5:
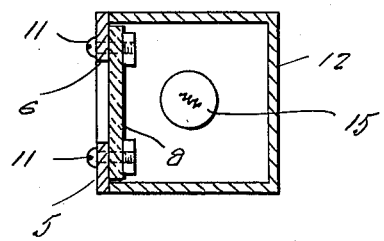
Figure 5 is a vertical transverse section therethrough.

Referring to the drawings in detail, it will be seen that the numeral 5 denotes an elongated plate having an oblong opening 6 therein. The plate is formed at its end with notches 7. A transparent panel 8 with suitable indicia 9 thereon such as a person's name or the like is mounted on the back of the plate 5 opposite the opening 6 and is held in place by lugs 10 on screws 11. The boxlike casing 12 is fixed to the rear of the plate 5 so that the panel 8 is disposed interiorly thereof, the lugs 10 have ears 10' through which screws are disposed to secure the lugs to the casing. An electric light fixture 14 extends through one end of the casing and has an incandescent bulb 15 in its inner end and a switch 16 on its outer end.

Numerals 17 denote suction cups in which are mounted screws 18 to be positioned in the notches 7 so that the device may be held on the inside of a windshield in any convenient or desired position and the name or like indicia on the panel will be displayed and may be illuminated after dark.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, in the combination and arrangement of parts may be resorted to without departing from the spirit or scope of the invention as hereinafter claimed or sacrificing any of its advantages.

Having thus described my invention, what I claim as new is:

In a sign of the character described, an elongated plate provided with suction cup receiving openings in the ends thereof, said plate having an opening at the intermediate portion thereof, means detachably securing a pane over the said opening, a box-like structure provided with illuminating means therein, said box being disposed against the plate with its open side registering with the opening in the plate.

In testimony whereof I affix my signature.

ARTHUR CLYDE SPEARS.